(12) United States Patent
Suzuki (10) Patent No.: US 6,686,704 B2
(45) Date of Patent: Feb. 3, 2004

(54) LAMP LIGHTING APPARATUS AND PROJECTOR USING THE SAME

(75) Inventor: Toshio Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/193,480

(22) Filed: Jul. 10, 2002

(65) Prior Publication Data

US 2003/0015972 A1 Jan. 23, 2003

(30) Foreign Application Priority Data

Jul. 13, 2001 (JP) .................................... P2001-213779
Dec. 20, 2001 (JP) .................................... P2001-387667

(51) Int. Cl.[7] ............................................. H05B 41/16
(52) U.S. Cl. ...................... 315/274; 315/219; 315/282; 315/291

(58) Field of Search .................................. 315/274, 276, 315/246, 282, 283, 284, 209 R, 219, DIG. 7

(56) References Cited

U.S. PATENT DOCUMENTS

| | | | | | |
|---|---|---|---|---|---|
| 5,019,953 | A | * | 5/1991 | Kawaberi et al. | 363/21.18 |
| 5,982,105 | A | * | 11/1999 | Masters | 315/169.3 |
| 6,087,757 | A | * | 7/2000 | Honbo et al. | 310/316.01 |

* cited by examiner

*Primary Examiner*—Don Wong
*Assistant Examiner*—Tuyet T. Vo
(74) *Attorney, Agent, or Firm*—Jay H. Maioli (57) ABSTRACT

A lamp lighting apparatus including a voltage control section for supplying a pulse voltage whose peak value rises stepwise, and a power conversion section for converting an output of the voltage control section into a high voltage and applying the high voltage to a lamp to light the lamp and for supplying, after the lamp is lit once, a self-sustaining discharge current to the lamp.

12 Claims, 10 Drawing Sheets

LAMP LIGHTING APPARATUS AND PROJECTOR USING THE SAME

BACKGROUND OF THE INVENTION

This invention relates to a lamp lighting apparatus and a projector which uses the lamp lighting apparatus, and more particularly to a lamp lighting apparatus which uses a metal halide lamp or the like and a projector which uses the lamp lighting apparatus.

A lamp lighting apparatus generates a high voltage for lighting and applies the high voltage to both of electrodes of a lamp to cause glow discharge to be produced by a glow switch or the like provided in the lamp. Then, the glow discharge changes into arc discharge in an arc tube to light the lamp.

Figure 8:
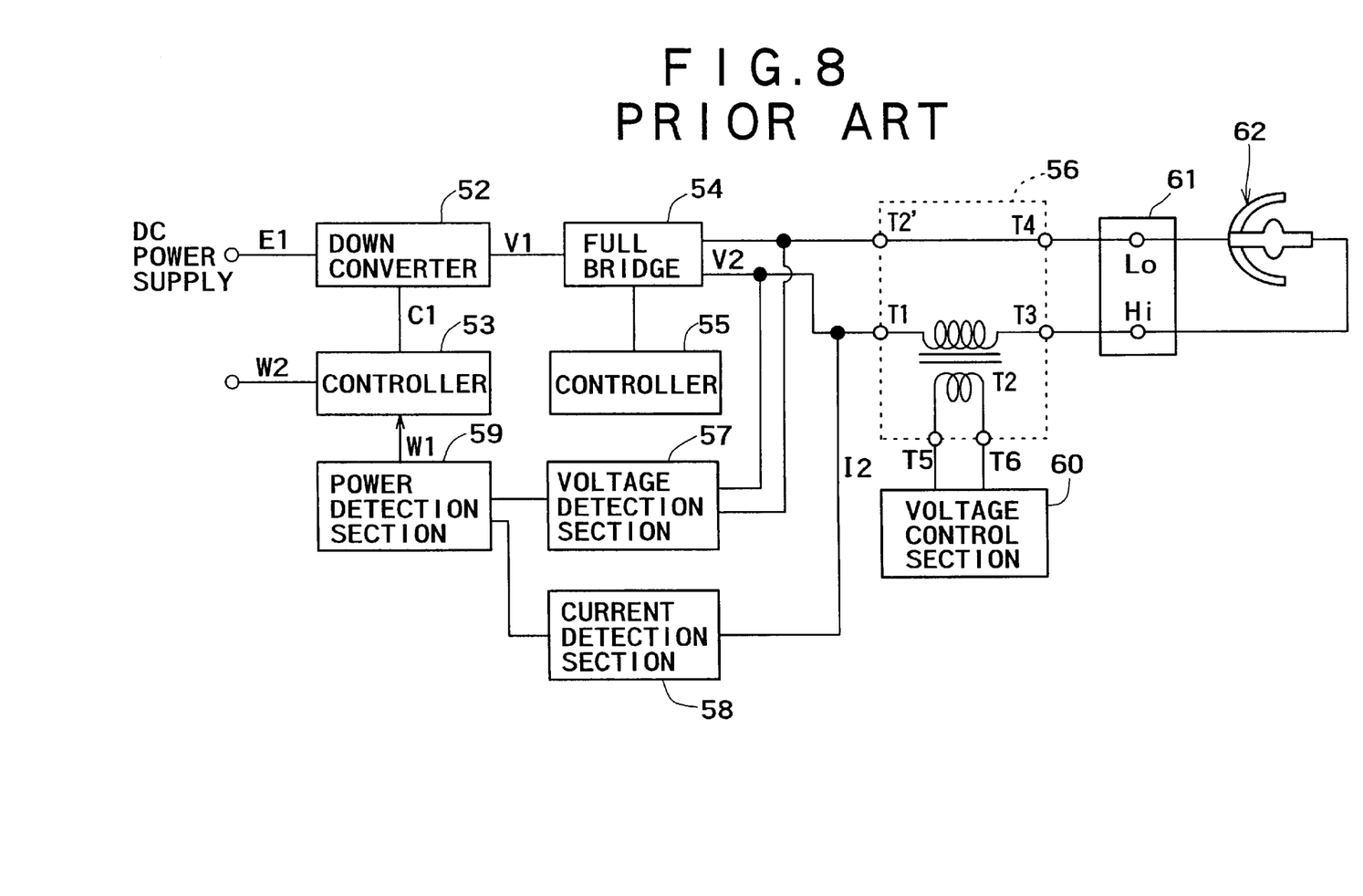
FIG. 8 is a block diagram showing a configuration of a related-art lamp lighting apparatus.

A typical lamp lighting apparatus shown in FIG. 8 includes an active filter, for example. Referring to FIG. 8, the lamp lighting apparatus comprises a down converter 52 which receives a DC voltage E1 normally of approximately 300 to 400 Vdc from a DC power supply and converts the DC voltage E1 once into a DC voltage V1 of approximately 50 to 100 Vdc, a controller 53 which inputs a control signal C1 obtained by comparing a detection power W1 from a power detection section 59 hereinafter described and a reference power W2 with each other to the down converter 52 to control the DC voltage V1 to keep a fixed power, a full bridge 54 which converts the DC voltage V1 of approximately 50 to 100 Vdc into an AC current having a frequency of approximately 90 to 200 Hz which is necessary to keep discharge of a lamp 62 and supplies the resulting AC current to the lamp 62, a controller 55 which sets a reference frequency fs of a drive signal for driving the full bridge 54 and controls on/off of the drive signal, an igniter 56 including an ignition outputting transformer T2 which generates a high voltage of 5 to 20 kV for lighting of the lamp 62 and transmits an AC voltage V2 of approximately 50 to 100 V for keeping of arc discharge, a voltage control section 60 for controlling the igniter 56, a voltage detection section 57 which detects a voltage value of the AC voltage V2 to be supplied from the full bridge 54 to the igniter 56, a current detection section 59 which detects a current value of AC current I2 to be supplied from the full bridge 54 to the igniter 56, a power detection section 58 which detects a detection power W1 from the voltage detected by the voltage detection section 57 and the current detected by the current detection section 58, and a connector 61 for establishing a connection to the lamp 62. It is to be noted that, when the present lamp lighting apparatus is applied to a projector, the controller 53 can be used also as a system controller, and if a power switch not shown is depressed and the controller 53 discriminates a power supply off state, then the controller 53, for example, opens a contact of a relay to switch off supply of the DC voltage E1 and enters a standby state. Then, if the power switch is depressed again and the controller 53 discriminates a power supply on state, then the present lamp lighting apparatus enters a normal operation mode and closes the contact of the relay to supply the DC voltage E1.

Figure 9:
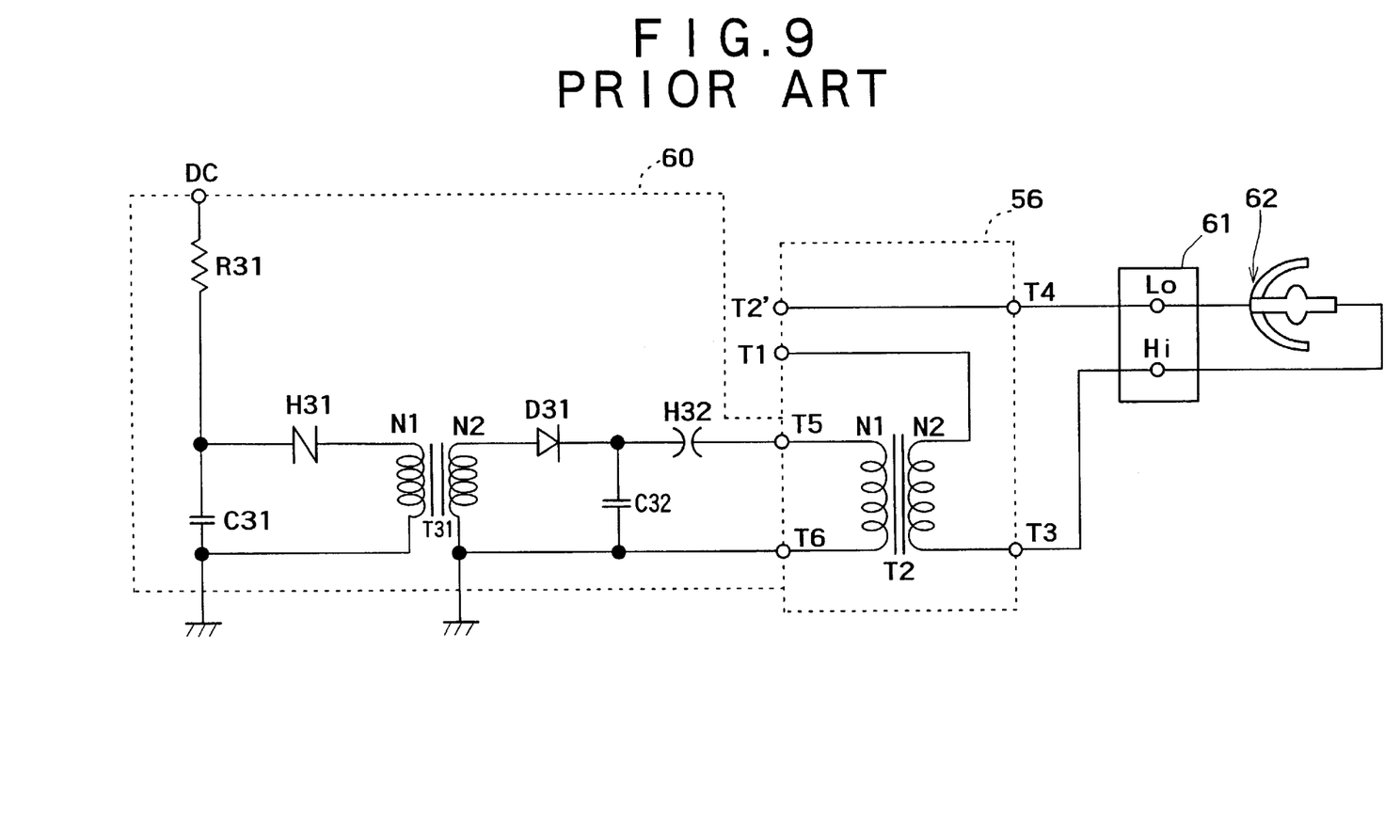
FIG. 9 is a schematic diagram showing a configuration of a voltage control section of the lamp lighting apparatus of FIG. 8.

The voltage control section 60 performs control for producing a high voltage of 5 to 20 kV upon lighting of the lamp 62. An exemplary configuration of the voltage control section 60 is shown in FIG. 9. Referring to FIG. 9, the voltage control section 60 shown includes a resister R31 and a capacitor C31 which form a series circuit to which a DC power supply DC of 300 Vdc is supplied, a boosting transformer T31 connected to a node between the resister R31 and the capacitor C31 through a switching element H31 such as a SIDAC, a diode D31 and a discharging gap element H32 which are connected to a secondary winding N2 of the boosting transformer T31 and form a series circuit, and a capacitor C32 which is connected to a node between the diode D31 and the discharging gap element H32 and which forms a parallel circuit together with the secondary winding N2 of the boosting transformer T31. The output side of the discharging gap element H32 is connected to a terminal T5, and the output side of the secondary winding N2 of the boosting transformer T31 and the capacitor C32 which form the parallel circuit is connected to a terminal T6.

Referring back to FIG. 8, the full bridge 54 is formed from a full bridge including, for example, field effect transistors (FETs) or the like. The gates of the FETs are controlled between on and off based on the reference frequency fs set by the controller 55.

Consequently, the full bridge 54 can convert the DC voltage V1 into an AC current having a frequency of approximately 90 to 200 Hz and can supply an AC current I2 necessary to keep lighting of the lamp 62 to the lamp 62 through the igniter 56 and the connector 61 which has a Lo terminal and a Hi terminal.

Referring to FIGS. 8 and 9, in the voltage control section 60 having the connection scheme described above, a voltage of 300 Vdc of the DC power supply first charges the capacitor C31 through the resister R31. Then, if the charging voltage of the capacitor C31 reaches, for example, 200 V, then the switching device H31 enters into a conducting state, and as a result, an excitation current flows to the primary side of the boosting transformer T31 while the capacitor C31 discharges. The charging voltage of the capacitor C31 drops as a result of the discharge just described, and finally, the switching device H31 enters into a non-conducting state and the excitation current does not flow to the boosting transformer T31 any more. Then, the voltage from the DC power supply charges the capacitor C31 again through the resister R31.

By the repeating cycle described above, a pulse voltage raised to 2 to 3 kV can be repetitively obtained on the secondary side of the boosting transformer T31.

The pulse voltage repetitively charges the capacitor C32 through the diode D31 on the secondary side of the boosting transformer T31, and as a result, a charging voltage of the capacitor C32 gradually rises. If this charging voltage reaches, for example, 1 kV, then the discharging gap element H32 starts discharge and an excitation current flows to the primary side of the outputting transformer T2 of the igniter 56 while the capacitor C32 discharges. The charging voltage drops as the capacitor C32 discharges, and finally, the discharging gap element H32 stops the discharge and the excitation current does not flow to the outputting transformer T2. Then, the raised pulse voltage charges the capacitor C32 again through the diode D31.

By the repeating cycle described above, a pulse voltage raised to, for example, 5 kV can be obtained on the secondary side of the outputting transformer T2 and the lamp 62 is lit.

Figure 10:
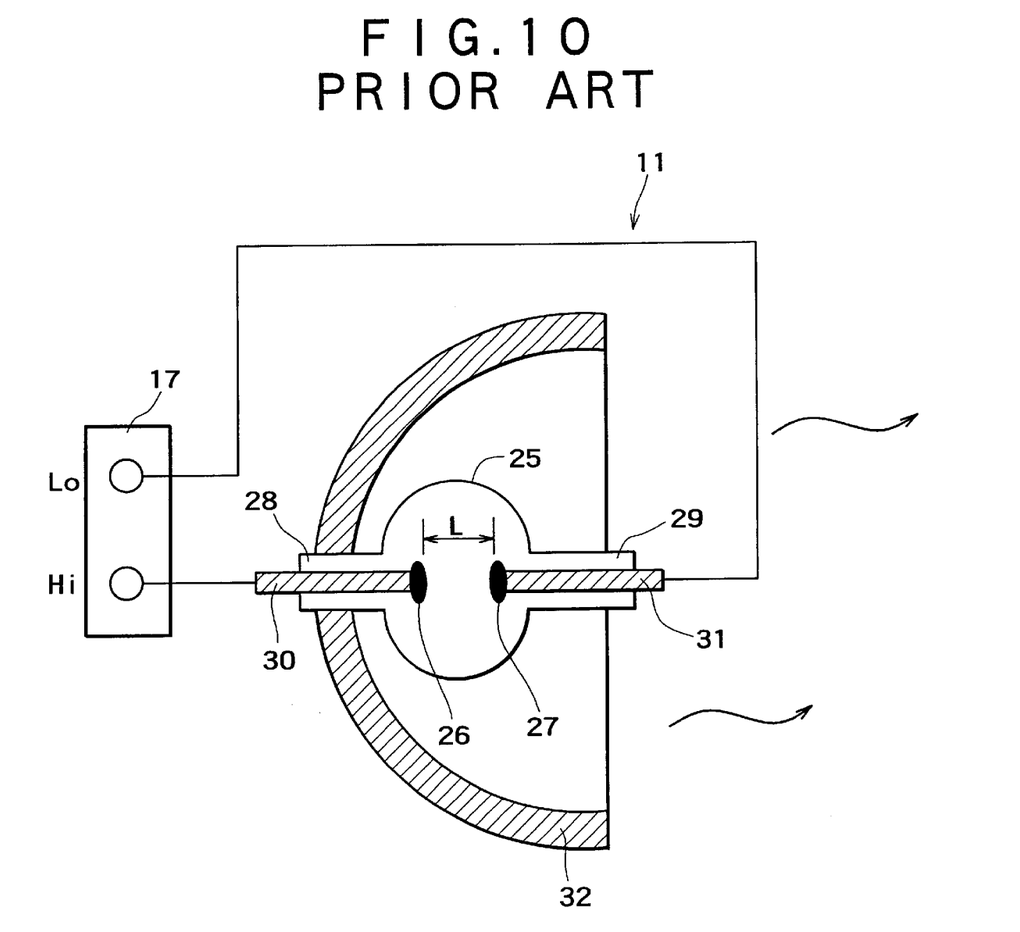
FIG. 10 is a sectional view schematically showing a configuration of a lamp shown in FIG. 8.

The lamp 62 may be, for example, a discharge lamp 11 such as a metal halide lamp shown in FIG. 10. Referring to FIG. 10, the discharge lamp 11 has a pair of electrodes 26 and 27 of the same structure arranged in a spaced relationship from each other in a translucent airtight vessel 25 formed from, for example, a heat resisting glass material so that they may have a predetermined electrode space distance L therebetween. The electrodes 26 and 27 are driven with an AC current.

The electrodes 26 and 27 are connected to metal conductors 30 and 31 sealed in seal sections 28 and 29 formed at both ends of the airtight vessel 25. The metal conductor 30 is connected to a terminal Hi of a connector 17 and the other metal conductor 31 is connected to another terminal Lo. Further, the seal section 28 of the airtight vessel 25 is fixed to a central portion of a reflector 32 having a hemispherical shape.

Then, a discharging medium which includes, for example, rare gas, cesium, rare earth metal, and halogen in addition to mercury and wherein the encapsulated amount of cesium is within a predetermined range is encapsulated in the airtight vessel 25. Thus, since steam of the several kinds of metals is included in a discharging arc of the mercury steam, peculiar optical spectra to the metals are emitted.

Consequently, the light emission efficiency is high, and a desired light emission characteristic can be obtained depending upon a combination of metals. Further, also the color temperature is high, and also the color is near to that of the natural light and a point-source light and parallel light can be extracted readily using a reflector or the like. Due to the advantages just described, the lamp 62 is utilized for a liquid crystal projector for which a high picture quality and a high luminance are required.

However, in the high voltage discharging lamp having such a configuration as described above, the discharge starting voltage is as low as, for example, 5 kV in a state wherein the temperature is low because of lapse of time after it is extinguished. However, in another state wherein the temperature of the lamp is high as at an instance such as immediately after it is extinguished, since the discharge starting voltage is high because the steam pressure is high, the lamp cannot be lit again with a voltage equal to that in the state wherein the temperature of the lamp is low. Only after the temperature drops as the time elapses and the steam pressure drops, discharging becomes possible and the lamp is lit again.

In this manner, in order to make it possible for the lamp to be lit even in a state wherein the temperature thereof is high immediately after it is extinguished, an unnecessarily high voltage is applied to the lamp.

Further, in the voltage control section 60 which performs ignition as described above with reference to FIG. 9, since discharge is started when the charging voltage of the capacitor C32 reaches the discharge starting voltage of the discharging gap element H32, the lighting voltage of the lamp depends upon the characteristic of the discharging gap element H32. Therefore, the voltage control section 60 of the lamp lighting apparatus has a drawback in that the discharging gap element H32 must be selected suitably for the lamp.

Accordingly, it is demanded to provide a lamp lighting apparatus which can light a lamp any time without the necessity for selection of a discharging gap element and without application of an unnecessarily high voltage.

SUMMARY OF THE INVENTION

In order to attain the object described above, according to an aspect of the present invention, there is provided a lamp lighting apparatus comprising voltage controlling means for supplying a voltage whose peak value rises stepwise, and power conversion means for converting an output of the voltage controlling means into a high voltage and applying the high voltage to a lamp to light the lamp and for supplying, after the lamp is lit, an AC current necessary to keep discharge of the lamp to the lamp.

In the lamp lighting apparatus, a high pulse voltage whose peak value is controlled to rise stepwise by the voltage controlling means is supplied to the lamp, whatever characteristic the lamp has, the lamp can be lit with a necessary but minimum high pulse voltage conforming with the characteristic of the lamp. Consequently, the burden on the lamp can be moderated and the life of the lamp can be increased.

Further, a high pulse voltage whose peak value is controlled to rise stepwise by the voltage controlling means is supplied to the lamp, only a minimum voltage is applied to a winding of the power conversion means, and consequently, otherwise possible deterioration by a high voltage can be prevented.

Furthermore, a high pulse voltage whose peak value is controlled to rise stepwise by the voltage controlling means is supplied to the lamp, the lamp can be replaced by another lamp which may have any different discharge starting voltage. This augments the convenience in use and makes the process of manufacture flexible. Also augmentation in service can be anticipated.

In addition, a high pulse voltage whose peak value is controlled to rise stepwise by the voltage controlling means is supplied to the lamp, when the lamp has a low temperature because time has passed after it was extinguished last, it can be lit with a low lighting voltage, but when the same lamp has a high temperature because much time has not passed after it was extinguished last, it can be lit with a corresponding high voltage. Consequently, the convenience in use can be augmented.

Where the voltage controlling means includes a charging circuit for supplying the charging voltage, a voltage dividing circuit for dividing the output of the charging circuit and a circuit for lowering the dividing ratio of the voltage dividing circuit stepwise, since the output of the voltage dividing circuit increases the time required until the predetermined voltage is reached, the peak value of the charging voltage can be increased stepwise.

According to another aspect of the present invention, there is provided a projector comprising voltage controlling means for supplying a voltage whose peak value rises stepwise, power conversion means for converting an output of the voltage controlling means into a high voltage and applying the high voltage to a lamp to light the lamp and for supplying, after the lamp is lit, an AC current necessary to keep discharge of the lamp to the lamp to keep the lamp in the lit state, a display panel for transmitting light therethrough or reflecting light emitted from the lamp lit by the power conversion means, and an optical system for projecting the output light of the display panel.

In the projector, a high pulse voltage whose peak value is controlled to rise stepwise by the voltage controlling means is supplied to the lamp, even when the lamp is not sufficiently cooled immediately after the power supply to the projector is stopped, the power supply can be made available to light the lamp. Consequently, the projector is augmented in convenience in use.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENTS

In the following, a lamp light apparatus and a projector having the lamp lighting apparatus incorporated therein according to the present invention are described with reference to the accompanying drawings. The lamp lighting apparatus according to a first embodiment of the present invention has a general configuration similar to that described hereinabove with reference to FIGS. 8 to 10, and therefore, it is not shown in the drawings to avoid redundancy, and for description of the lamp lighting apparatus, reference is had also to FIGS. 8 to 10. The lamp lighting apparatus according to the first embodiment of the present invention is different from the lamp lighting apparatus of FIGS. 8 to 10 in that it includes a voltage control section 19 for controlling lighting of a lamp in place of the voltage control section 60.

Figure 1:
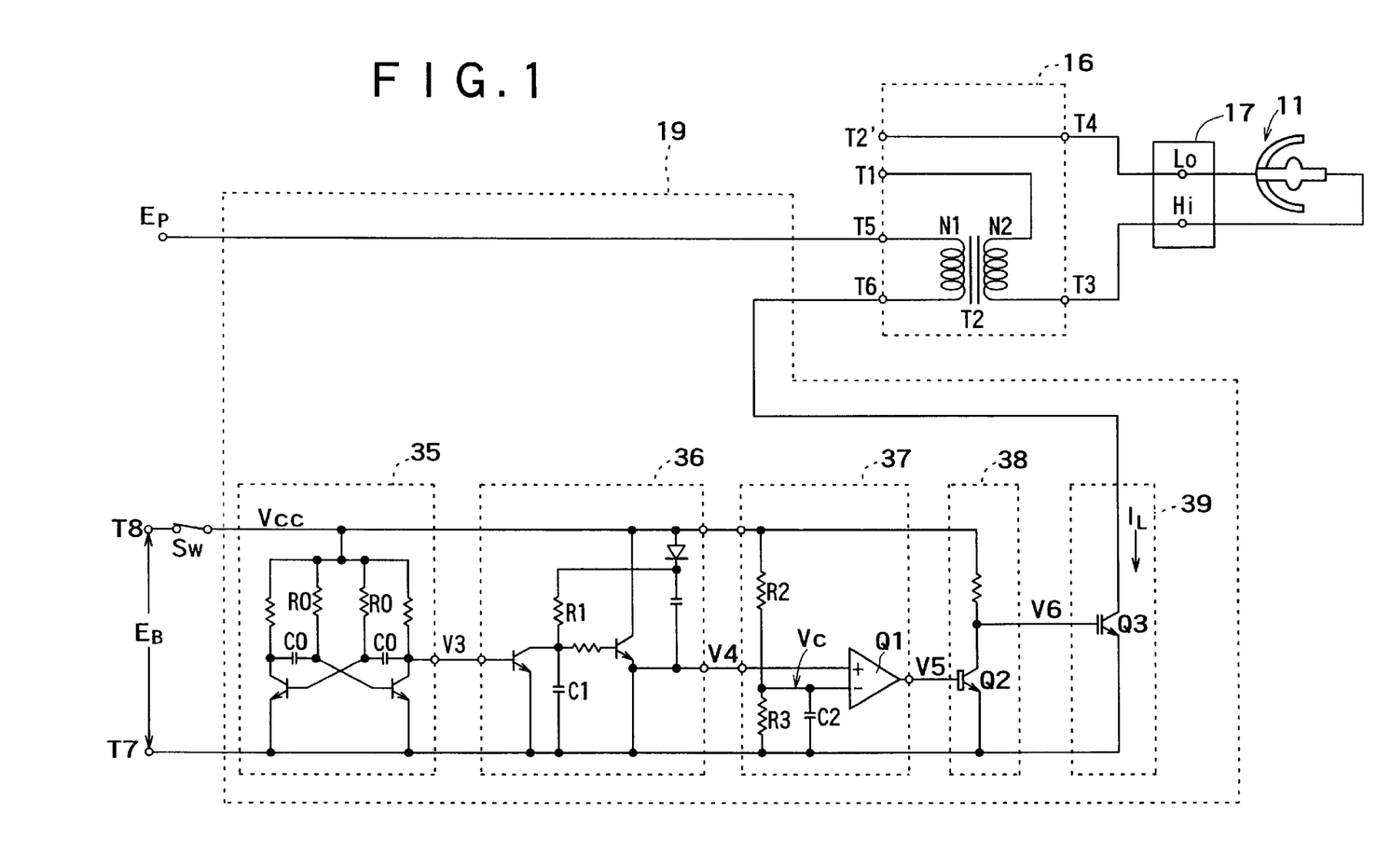
FIG. 1 is a schematic view showing a configuration of a voltage control section which is a component of a lamp lighting apparatus according to a first embodiment of the present invention.

The voltage control section 19 is particularly shown in FIG. 1. Referring to FIG. 1, the voltage control section 19 includes a power supply EB for supplying a DC voltage Vcc of, for example, 15 Vdc, a switch Sw, a multivibrator circuit 35 for generating a rectangular wave voltage V3 of a predetermined oscillation frequency, a bootstrap circuit 36 for generating a triangular wave voltage V4, a comparator circuit 37 for comparing the triangular wave voltage V4 and a comparison voltage Vc with each other, an inversion circuit 38 for inverting a pulse signal voltage V5 from the comparator circuit 37 to produce an inverted voltage V6, and an outputting circuit 39.

The multivibrator circuit 35 may be a multivibrator circuit which is used commonly, and the DC voltage Vcc from the power supply $E_B$ is applied to power supply terminals T7 and T8 of the multivibrator circuit 35 through the switch Sw. The multivibrator circuit 35 outputs the rectangular wave voltage V3 of an oscillation frequency f ($\approx 0.7 \cdot C0 \cdot R0$) which depends upon a capacitor C0 and a resistor R0 built therein.

The bootstrap circuit 36 may be a bootstrap circuit which is used commonly, and converts a rectangular wave signal of the rectangular wave voltage V3 inputted thereto from the multivibrator circuit 35 into a triangular wave signal with a time constant which depends upon a capacitor C1 and a resistor R1 built therein and outputs the triangular wave signal as the triangular wave voltage V4.

The triangular wave voltage V4 of the triangular wave signal is inputted to a noninverting input terminal (+) of an operational amplifier Q1 which composes the comparator circuit 37 while a comparison voltage Vc obtained by division of the DC voltage Vcc by a resistor R2 and a combined resistance of another resistor R3 and a capacitor C2 is applied to an inverting input terminal (−) of the operational amplifier Q1. When the triangular wave voltage V4 exceeds the comparison voltage Vc, a pulse signal voltage V5 of a rectangular waveform is outputted from an output terminal of the operational amplifier Q1.

The inversion circuit 38 may be composed of a transistor Q2 and so forth. The pulse signal voltage V5 of a rectangular wave signal is inputted to the base of the transistor Q2 while an inverted voltage V6 of the rectangular wave signal having a polarity inverted from that of the pulse signal voltage V5 is obtained at the collector of the transistor Q2.

The outputting circuit 39 is composed of an insulated gate bipolar transistor (IGBT) Q3. The inverted voltage V6 from the inversion circuit 38 is applied to the gate of the insulated gate bipolar transistor Q3, and the positive side of a DC power supply $E_P$ is connected to the collector of the insulated gate bipolar transistor Q3 through the primary winding N1 of the ignition outputting transformer T2.

Now, operation of the voltage control section 19 having the configuration described above is described with reference FIGS. 1, 2 and 3.

Figure 2A:
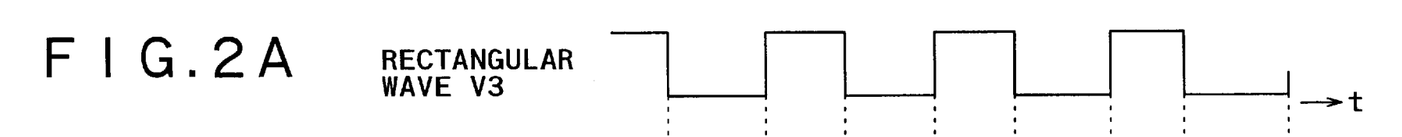
FIGS. 2A through 2E and 3A through 3E are waveform diagrams illustrating operation of the voltage control section shown in FIG. 1.

First, if the power button not shown is depressed and the system controller discriminates a power supply on state, then the switch Sw is switched on so that the DC voltage Vcc is supplied from the power supply $E_B$ to the voltage control section 19. Consequently, the multivibrator circuit 35 is rendered operative, and a rectangular wave voltage V3 of a rectangular wave signal having an amplitude which increases as the time passes and having a predetermined frequency f as seen from FIG. 2A is outputted from the output terminal of the multivibrator circuit 35.

Figure 2B:
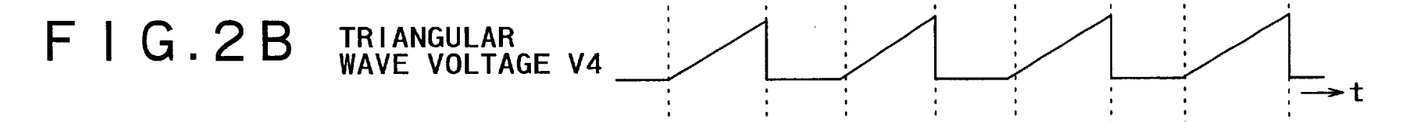

The rectangular wave voltage V3 of the rectangular wave signal is inputted to the bootstrap circuit 36 and converted into a triangular wave voltage V4 as shown in FIG. 2B, which is outputted from the output terminal of the bootstrap circuit 36.

Figure 2C:
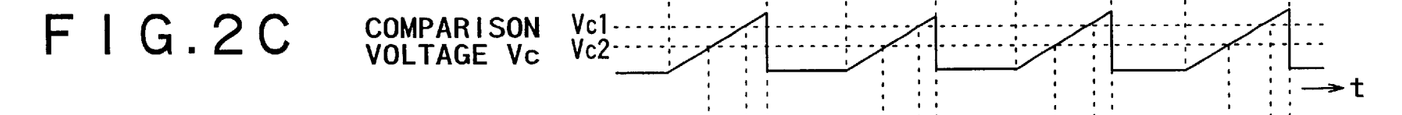
Figure 2D:
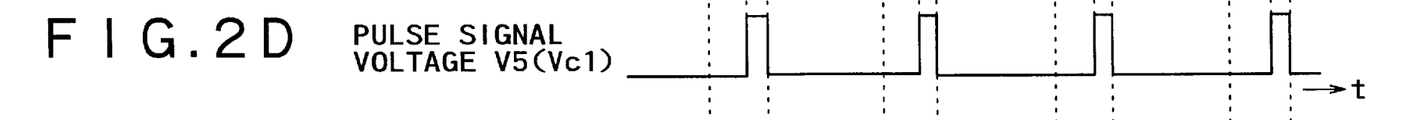
Figure 2E:
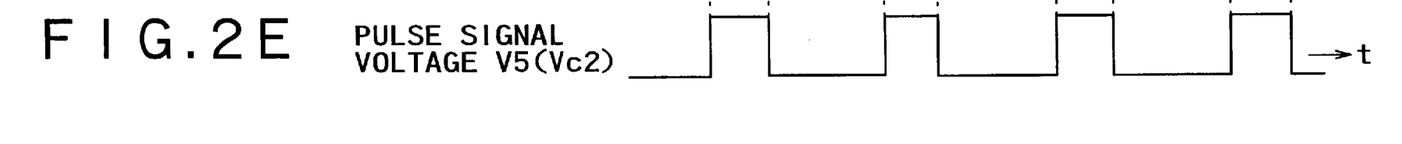

The triangular wave voltage V4 is inputted to the comparator circuit 37, by which it is compared with comparison voltages Vc1 and Vc2 produced from the comparison voltage Vc as seen from FIG. 2C. Consequently, a pulse signal voltage V5 of a rectangular wave signal (FIGS. 2D and 2E) is outputted from the output terminal of the comparator circuit 37.

Since the comparison voltage Vc appearing across the capacitor C2 increases, for example, from the comparison voltage Vc2 to the comparison voltage Vc1 with respect to the triangular wave voltage V4 as seen from FIG. 2C, the pulse width of the pulse signal voltage V5 of the output of the comparator circuit 37 exhibits different values depending upon with which one of the comparison voltages Vc2 and Vc1 the triangular wave voltage V4 is compared. For example, if the triangular wave voltage V4 is compared with the comparison voltage Vc1, then the pulse width of the pulse signal voltage V5 is small as seen from FIG. 2D, but if the triangular wave voltage V4 is compared with the comparison voltage Vc2, then the pulse width of the pulse signal voltage V5 is great as seen from FIG. 2E.

In this instance, if the switch Sw is switched on, then since the capacitor C2 of the comparator circuit 37 shown in FIG. 1 is charged from the DC voltage Vcc, as the time t passes, the comparison voltage Vc rises from 0 V finally to a voltage VM which depends upon Vcc*[(R3)/(R2+R3)].

Figure 3A:
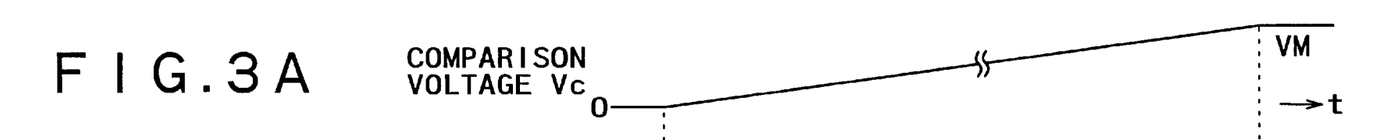
Figure 3B:
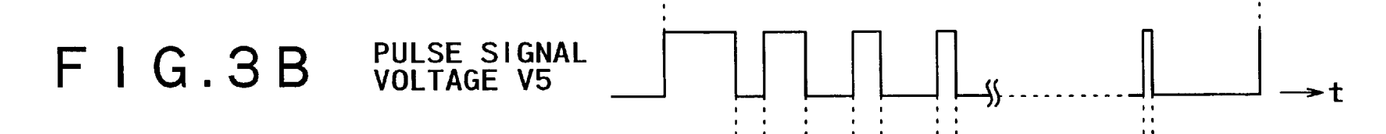

Since the comparison voltage Vc rises as the time t passes in this manner, the pulse width of the pulse signal voltage V5 decreases as the time t passes in a corresponding relationship as seen from FIG. 3B.

Figure 3C:
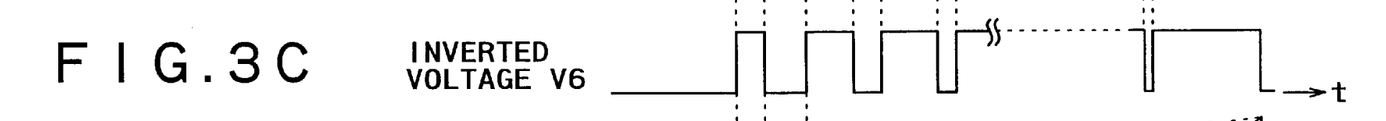

Then, the pulse signal voltage V5 is inverted by the inversion circuit 38 and inputted as such an inverted voltage V6 as seen from FIG. 3C to the gate of the insulated gate bipolar transistor Q3 of the outputting circuit 39.

The insulated gate bipolar transistor Q3 of the outputting circuit 39 exhibits a collector current $I_L$ (FIG. 3D) whose peak current value increases in proportion to the pulse width of the inverted voltage V6. When the insulated gate bipolar transistor Q3 is turned off, avalanche breakdown occurs with the insulated gate bipolar transistor Q3 due to energy accumulated in the inductance L1 of the primary winding N1 of the outputting transformer T2, and thereupon, an induced voltage $V_L$ (FIG. 3E) corresponding to the winding number ratio (N2/N1) of the ignition outputting transformer T2 is generated in the secondary winding N2.

The voltage to be generated when the insulated gate bipolar transistor Q3 is turned off is represented generally by L(di/dt) where the inductance is represented by L and the collector current is represented by i, and the energy value then is represented by $1/2*L*i^2$. Both of the voltage and the energy value can be controlled with the inductance L and the collector current i.

Figure 3D:
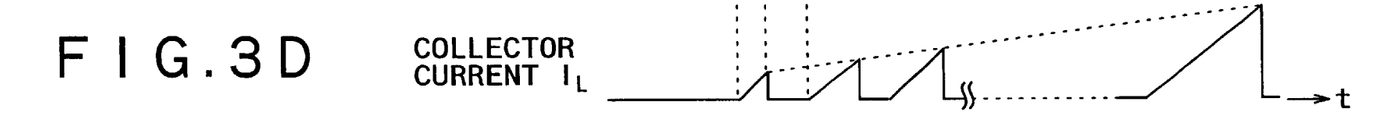

When the pulse width of the inverted voltage V6 applied to the insulated gate bipolar transistor Q3 is small as shown in FIG. 3D, the collector current i of the insulated gate bipolar transistor Q3 is low and also the energy accumulated in the inductance L is low. Therefore, also the induced voltage $V_L$ generated in the secondary winding N2 of the ignition outputting transformer T2 when the insulated gate bipolar transistor Q3 is turned off is low as seen from FIG. 3E.

Figure 3E:
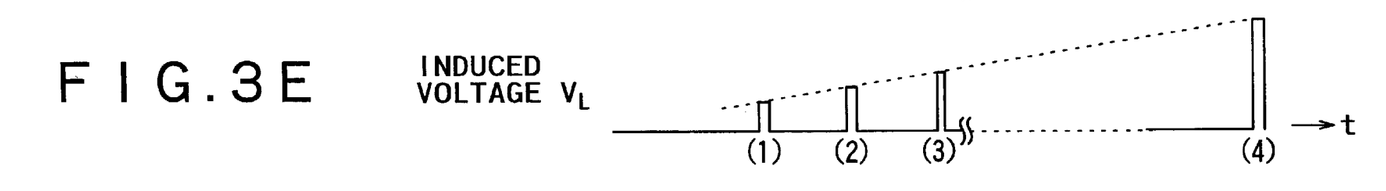

On the contrary, when the pulse width of the inverted voltage V6 applied to the insulated gate bipolar transistor Q3 is great, the collector current $I_L$ of the insulated gate bipolar transistor Q3 is high and also the energy accumulated in the inductance L1 is high. Therefore, the induced voltage $V_L$ generated in the secondary winding N2 of the ignition outputting transformer T2 when the insulated gate bipolar transistor Q3 is turned off is high.

Since the pulse width of the inverted voltage V6 to be applied to the insulated gate bipolar transistor Q3 gradually increases as seen from FIG. 3D, also the induced voltage $V_L$ generated in the secondary winding N2 gradually rises.

In particular, since the induced voltage $V_L$ gradually rises, also where a lamp having a different discharge voltage characteristic is adopted for the lamp 11, discharge can be started at some voltage point of the induced voltage $V_L$, and the lamp 11 can be lit flexibly in accordance with the characteristic thereof. If is to be noted that, since the role of the voltage control section 19 is completed when discharge is started, if the system controller discriminates that the lamp is lit, then it switches off the switch Sw to stop the supply of the DC voltage Vcc from the power supply $E_B$ thereby to stop the operation of the voltage control section 19.

Usually, since various lamps start discharge thereof within a range of approximately 5 to 20 kV, as seen in FIG. 3E, the induced voltage $V_L$ at (1) is 5 kV and the induced voltage $V_L$ at (4) is 20 kV, and at (2) and (3) between (1) and (4), the induced voltage is 10 kV and 15 kV, respectively.

It is to be noted that the pulse width and the repeating interval of the inverted voltage V6 inputted to the insulated gate bipolar transistor Q3 can be changed or selected freely and also the inductance values, the winding number ratio and so forth of the primary winding N1 and the secondary winding N2 of the ignition outputting transformer T2 of the igniter 16 can be selected arbitrarily for various lamps.

Now, another voltage control section 19 which is incorporated in the lamp lighting apparatus according to a second embodiment of the present invention is described with reference to FIGS. 4 and 5.

Figure 4:
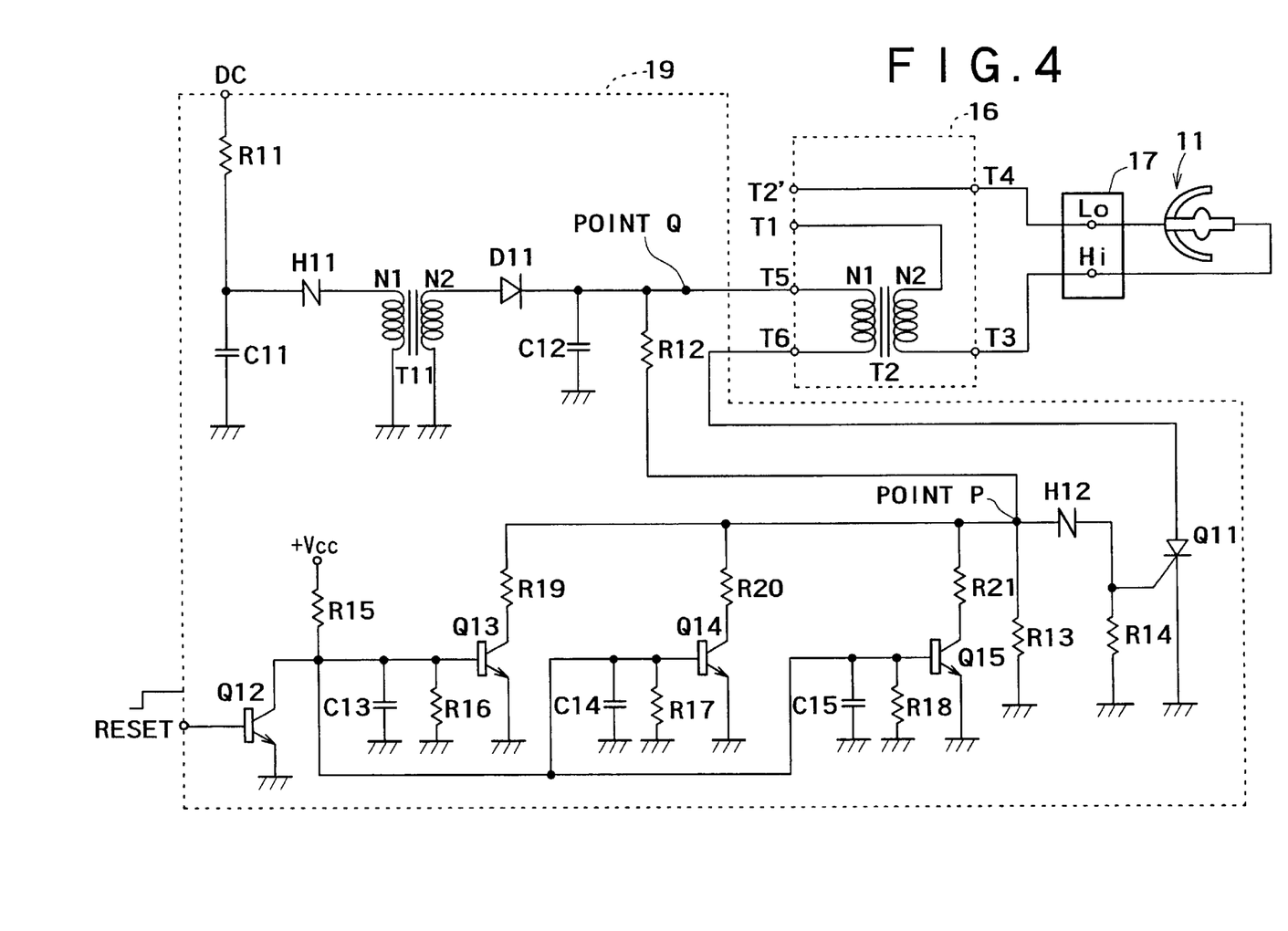
FIG. 4 is a schematic view showing a configuration of a voltage control section which is a component of a lamp lighting apparatus according to a second embodiment of the present invention.
Figure 5:
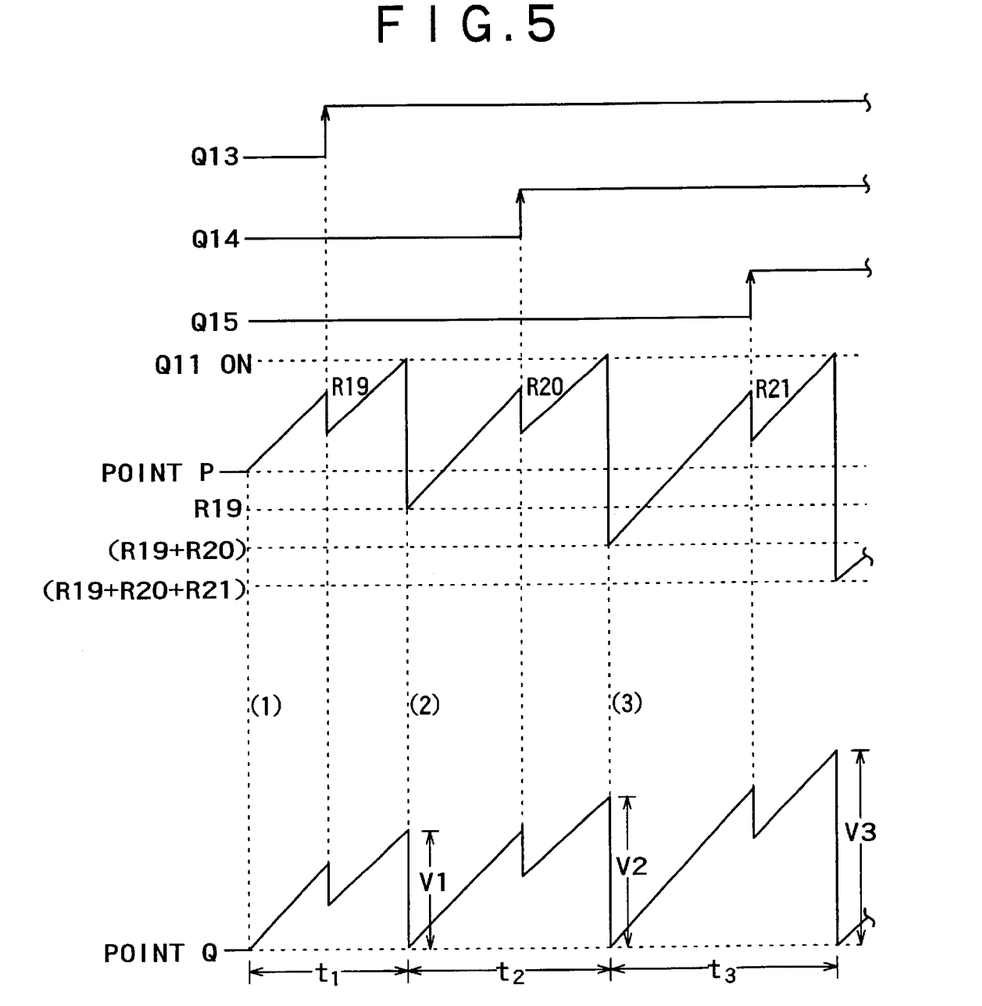
FIG. 5 is a waveform diagram illustrating operation of the voltage control section shown in FIG. 4.

Referring to FIG. 4, the voltage control section 19 includes a charging circuit for supplying a voltage charged in a capacitor C12, a voltage dividing circuit for dividing the charging voltage, and a control circuit for controlling so that the charging voltage is applied to the primary winding N1 of the ignition outputting transformer T2 when the divided voltage obtained by the voltage dividing circuit becomes equal to a predetermined voltage, and successively inserts resistors R19, R20 and R21 in parallel to a resistor R13 after each predetermined interval of time to increase the time required to charge the capacitor C12 every time thereby to raise the voltage at a point Q stepwise.

The charging circuit includes a capacitor C11 to which a DC power supply DC of 300 Vdc is supplied through a resistor R11, a boosting transformer T11 connected to a node between the resistor R11 and the capacitor C11 through a switching element H11 such as a SIDAC, and a diode D11 and a capacitor C12 connected to the secondary winding N2 of the boosting transformer T11 and forming a series circuit. A node between the diode D11 and the capacitor C12 is connected to the terminal T5 of the igniter 16.

The voltage control section 19 includes a capacitor C13 to which the DC voltage Vcc of, for example, 15 Vdc is supplied through a resistor R15, a resistor R16 connected to a node between the resistor R15 and the capacitor C13 and forming a parallel circuit together with the capacitor C13, a switching element Q13 connected at the base thereof to the node between the resistor R15 and the capacitor C13 and connected at the collector thereof to a resistor R19, a capacitor C14 which forms a series circuit together with the resistor R15 through which the DC voltage Vcc is supplied, a resistor R17 which forms a parallel circuit together with the capacitor C14, a switching element Q14 connected at the base thereof to the node between the resistor R15 and the capacitor C14 and connected at the collector thereof to a resistor R20, a capacitor C15 which forms a series circuit together with the resistor R15 through which the DC voltage Vcc is supplied, a resistor R18 which forms a parallel circuit together with the capacitor C15, a switching element Q15 connected at the base thereof to the node between the resistor R15 and the capacitor C15 and connected at the collector thereof to a resistor R21, a switching element Q12 for discharging charge accumulated in the capacitors C13, C14 and C15 when a reset voltage is applied thereto at a predetermined timing, a voltage dividing circuit formed from a resistor R12 and the resistor R13 connected between a point Q and the grounding point of the charging circuit, a discharging element H12 and a resistor R14 which form a series circuit connected to the node between the resistor R12 and the resistor R13, and a thyristor Q11 connected at the gate thereof to a node between the discharging element H12 and the resistor R14. The anode side of the thyristor Q11 is connected to the terminal T6 connected to the primary winding N1 of the ignition outputting transformer T2 of the igniter 16.

The resistor R15 for supplying the DC voltage Vcc cooperates with the capacitors C13, C14 and C15 to form three charging circuits, and the charging voltages charged in the charging circuits are supplied to the bases of the switching elements Q13, Q14 and Q15, respectively. When any of the supplied voltages reaches the base driving voltage of the corresponding one of the switching elements Q13, Q14 and Q15, then it is turned on and connects the parallel resistors R19, R20 and R21 to the resistor R13. Consequently, the potential at the point P drops.

Here, if it is assumed that the capacitance values of the capacitors C13, C14 and C15 have a relationship of C13<C14<C15, then the switching elements Q13, Q14 and Q15 are successively turned on in order of the switching elements Q13, Q14 and Q15.

By successively turning on the switching elements Q13, Q14 and Q15 in this order, the potential at the point P can be lowered stepwise, and as a result, the timing at which the thyristor Q11 is to be turned on can be delayed successively. Since the delaying of the timing at which the thyristor Q11 is turned on increases the time for which the capacitor C12 is charged, the voltage charged in the capacitor C12 becomes higher, and the voltage to be supplied to the primary winding N1 of the ignition outputting transformer T2 when the thyristor Q11 is turned on becomes higher. As a result, the voltage obtained at the secondary winding N2 rises.

In short, as charging of the capacitors C13, C14 and C15 proceeds through the resistor R15 and the switching elements Q13, Q14 and Q15 are successively turned on, the output voltage of the ignition outputting transformer T2, that is, the voltage to be supplied to the lamp 11, can be raised gradually. It is to be noted that the charging operation through the resistor R15 can be reset by causing the switching element Q12 to be turned on.

Since the switching elements Q13, Q14 and Q15 are successively switched on in this order as the time passes, the voltage to be supplied to the lamp 11 rises stepwise in this manner. Since the lamp 11 is lit when the voltage supplied to the lamp 11 reaches the discharge starting voltage necessary for starting of lighting of the lamp 11, even if the lamp has a high discharge starting voltage, it can be lit as the time passes. Therefore, even if various lamps having different characteristics are applied as the lamp 11, there is no necessity to take the discharge starting voltage of the lamp 11 into consideration every time.

Operation of the voltage control section 19 shown in FIG. 4 is described with reference also to a waveform diagram of FIG. 5.

First, when the system controller is in its standby state, a reset voltage is continuously applied from the system controller to the switching element Q12, and consequently, the switching element Q12 is in an on state. Therefore, the capacitors C13, C14 and C15 remain in a discharged state and have no charge therein. If the power button not shown is depressed and the system controller discriminates a power supply on state, then the system controller enters into a normal operation mode and ends application of the reset voltage. Consequently, the switching element Q12 is turned off, and charging of the capacitors C13, C14 and C15 through the resistor R15 is started. When the capacitors C13, C14 and C15 are successively charged up until predetermined voltages are reached as seen in FIG. 5, the switching elements Q13, Q14 and Q15 are successively switched on in this order.

Here, the potential at the point P when the switching element Q13 is not on is equal to a potential obtained by dividing the potential at the point Q by means of the resistor R12 and the resistor R13.

If the voltage of the capacitor C11 charged reaches the predetermined value, then the switching element H11 is rendered conducting, and the primary winding of the boosting transformer T11 is excited. Consequently, an induced voltage of 2 to 3 kV is generated in the secondary winding of the boosting transformer T11, and charging (1) for the first time of the capacitor C12 is started through the diode D11. Consequently, the potential at the point Q rises, and also the potential at the point P rises.

If this state continues until the charging voltage of the capacitor C13 reaches the voltage at which the switching element Q13 is to be turned on, then the switching element Q13 is turned on. Consequently, the resistor R19 is connected in parallel to the resistor R13, and the voltage at the point P drops by a voltage corresponding to the resistor R19. When the resistor R19 is connected in parallel to the resistor R13, since the load becomes heavier, also the voltage at the point Q drops.

If the charging voltage of the capacitor C11 rises in this state until the switching element H11 becomes conducting, then the primary winding of the boosting transformer T11 is excited and an induced voltage generated in the secondary winding charges the capacitor C12 through the diode D11 again. Consequently, the potential at the point Q rises, and also the voltage at the point P rises. When the voltage at the point P reaches the discharge starting voltage of the discharging element H12, the discharging element H12 starts its discharge. Consequently, a voltage is applied to the gate of the thyristor Q11, and the thyristor Q11 is turned on. When the thyristor Q11 is turned on, an excitation current flows through the primary winding N1 of the ignition outputting transformer T2 due to the voltage V1 charged in the capacitor C12, and thereupon, an induced voltage is generated in the secondary winding N2 of the ignition outputting transformer T2 and applied to the lamp 11. The voltage charged in the capacitor C12 is discharged when the thyristor Q11 is turned on, and thereupon, the voltages at the points Q and P drop. Consequently, the discharging by the discharging element H12 stops and the thyristor Q11 is switched off, and charging (2) for the second time of the capacitor C12 is started.

Since the resistor R19 is already connected in parallel to the resistor R13 when charging of the capacitor C12 is started in the charging (2) for the second time, the voltage at the point P is lower than that when the charging for the first time is started. Therefore, the time $t_2$ after which the thyristor Q11 is turned on is longer than the time $t_1$ required for the charging for the first time.

While the charging (2) for the second time is started in this manner, charging of the capacitor C14 proceeds. Then, when the charging voltage with which the switching element Q14 is turned on is reached, then the switching element Q14 is turned on. Consequently, the resistor R20 is connected further in parallel to the parallel circuit of the resistor R13 and the resistor R19, and the voltage at the point P drops by an amount corresponding to the resistor R20. When the resistor R20 is connected in parallel in this manner, also the voltage at the point Q drops because the load becomes heavier. If the capacitor C12 is charged in this manner, then the voltage at the point P reaches the voltage with which the discharging element H12 discharges after an excess interval of time provided by the resistor R20 is required.

Then, discharging of the discharging element H12 is started and an on-voltage is applied to the gate of the thyristor Q11 to turn on the thyristor Q11. After the thyristor Q11 is turned on, an excitation current flows through the primary winding N1 of the ignition outputting transformer T2 due to the voltage V2 charged in the capacitor C12, and an induced voltage is generated in the secondary winding N2 of the ignition outputting transformer T2. Consequently, the voltage V2 higher than the voltage for the first time can be supplied to the lamp 11.

Then, the voltage charged in the capacitor C12 is discharged as a result of the turning on of the thyristor Q11. Consequently, since the voltages at the points Q and P drop, the discharging by the discharging element H12 stops, and the thyristor Q11 is turned off and charging (3) for the third time of the capacitor C12 is started.

While the charging (3) for the third time of the capacitor C12 is started in this manner, the charging of the capacitor C15 proceeds. Then, when the voltage of the capacitor C15 reaches the charging voltage with which the switching element Q15 is turned on, the switching element Q15 is turned on. Consequently, the resistor R21 is further connected in parallel to the parallel circuit of the resistors R13, R19 and R20, and the voltage at the point P drops by an amount corresponding to the resistor R21. As the capacitor C12 is charged in this state, the voltage at the point P reaches the voltage with which the discharging element H12 is discharged after lapse of additional time corresponding to the drop of the voltage by the resistor R21.

Thereupon, discharging of the discharging element H12 is started, and an on-voltage is applied to the gate of the thyristor Q11 to turn on the thyristor Q11. After the thyristor Q11 is turned on, an excitation current flows through the primary winding N1 of the ignition outputting transformer T2 due to the voltage V3 charged in the capacitor C12, whereupon an induced voltage is generated in the secondary winding N2 of the ignition outputting transformer T2. Consequently, an ignition voltage higher than the ignition voltage for the second time can be supplied to the lamp 11.

The voltage charged in the capacitor C12 is discharged when the thyristor Q11 is turned on. Consequently, since the voltages at the points Q and P drop, the discharging of the discharging element H12 stops and the capacitor C12 starts charging again.

In this manner, when the capacitors C13, C14 and C15 are charged up to predetermined voltages and the switching elements Q13, Q14 and Q15 are successively turned on so that the resistors R19, R20 and R21 are successively connected in parallel to the resistor R13, the voltage at the point P drops every time. Therefore, the time required until the thyristor Q11 is turned on increases every time, and accordingly, the voltage charged in the capacitor C12 rises stepwise. Accordingly, since the induced voltage generated in the secondary winding N2 of the ignition outputting transformer T2 when the thyristor Q11 is turned on and an excitation current flows through the primary winding N1 of the ignition outputting transformer T2 due to the voltage charged in the capacitor C12 rises stepwise, even where a lamp having a different discharge voltage characteristic is used as the lamp 11, the lamp 11 can be lit even in a state wherein the temperature thereof is high such as immediately after it is extinguished. It is to be noted that, after the lamp 11 is lit, since application of the reset voltage from the system controller continues and the switching element Q12 keeps an on state, the capacitors C13, C14 and C15 are not charged. Further, after the lamp 11 is lit, since the voltage of the DC power supply DC drops, the voltage charged in the capacitor C11 is so low that the discharging element H12 cannot be turned on. Therefore, after the lamp 11 is lit, operation of the voltage control section 19 is disabled.

It is to be noted that, while, in the foregoing description, the DC voltage is raised from the DC voltage of 300 Vdc, first by the boosting transformer T11 and further by the outputting transformer T2 in order to obtain an output of the peak voltage of 20 kV if there is no restriction to the size of a transformer, the two transformers can be replaced by a single transformer, for example, if the winding number ratio of the secondary winding to the primary winding is set to 1:100.

Figure 6:
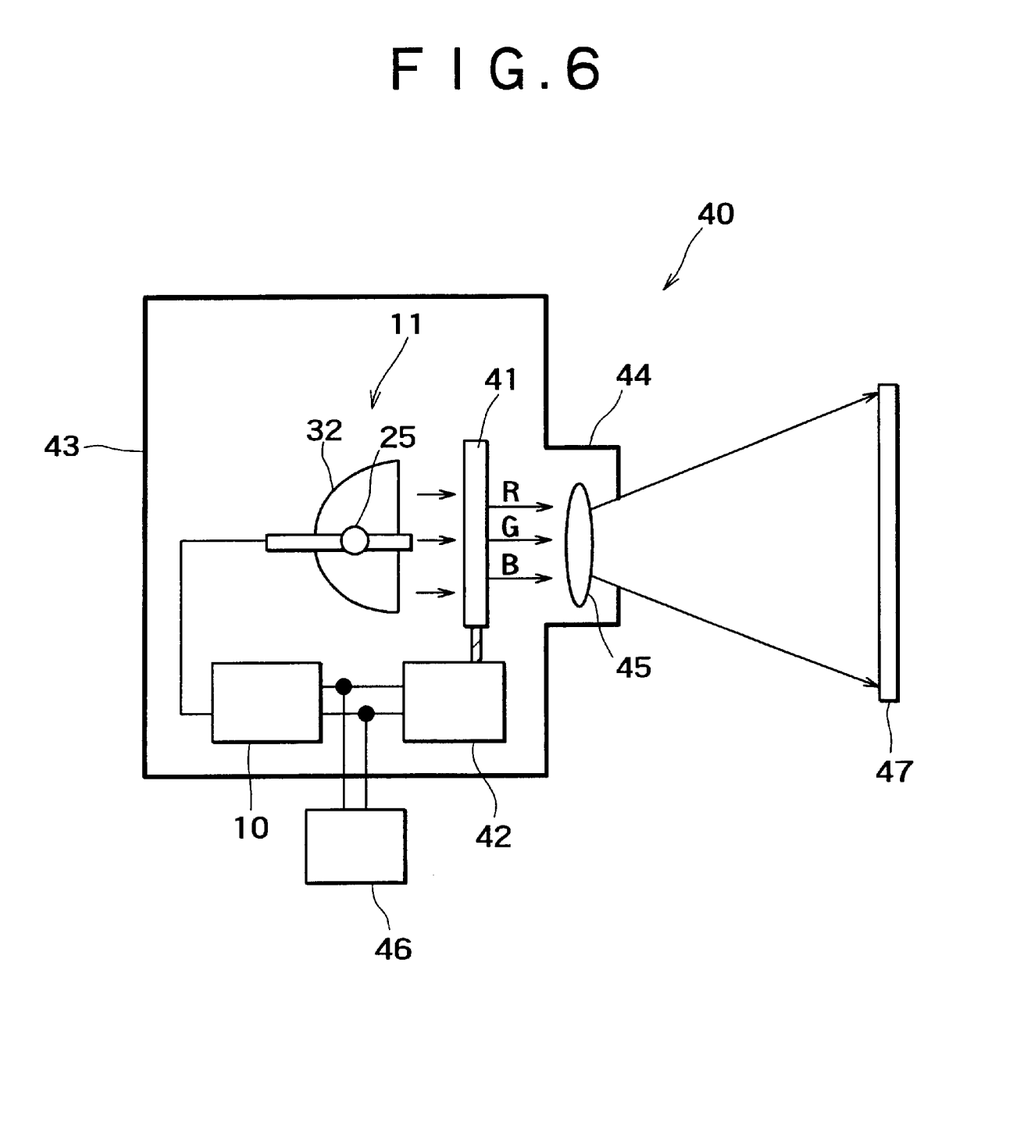
FIG. 6 is a schematic view showing a configuration of a projector according to a third embodiment of the present invention.

Now, a projector according to a third embodiment of the present invention is described with reference to FIG. 6.

A projector 40 shown is formed as a projector of the transmission type and includes the lamp lighting apparatus 10 in which the voltage control section 19 according to the first and second embodiments with reference to FIG. 1 or 4 is incorporated.

The projector 40 of the transmission type includes, in addition to the lamp lighting apparatus 10, a lamp 11 having a reflector 32 for reflecting light emitted from a light source thereof, a liquid crystal panel 41 of the light transmission type such as, for example, a color liquid crystal panel on which light irradiated from the reflector 32 is projected, a liquid crystal driver 42 for driving the liquid crystal panel 41, and a housing 43 for accommodating the components therein. The housing 43 has a floodlighting section 44 at a portion thereof opposing to the liquid crystal panel 41, and a lens 45 serving as an optical system is disposed in the floodlighting section 44. A power is supplied from a power supply 46 to the lamp lighting apparatus 10 and the liquid crystal driver 42.

When a power is supplied to the lamp lighting apparatus 10 in which the voltage control section 19 is incorporated to light the lamp 11, light is emitted from the lamp 11 and reflected by the reflector 32 so that it is irradiated upon the liquid crystal panel 41.

The liquid crystal panel 41 includes R, G and B color filters not shown corresponding to pixels, and the color filters are controlled by the liquid crystal driver 42 which operates in response to a color image signal.

When the light passes through the liquid crystal panel 41, it is colored to R, G or B by the color filters. The colored light is condensed by the lens 45 and projected on a screen 47. Consequently, a color image controlled by the liquid crystal panel 41 is projected on the screen 47.

Also in this instance, when the lamp 11 is to be lit, the induced voltage $V_L$ which gradually rises is applied to the lamp 11 to light the lamp 11 in accordance with the characteristic of the lamp 11. Therefore, also the projector 40 has such a characteristic of the voltage control section 19 that a lamp is lit without application of an unnecessarily high voltage thereto.

Figure 7:
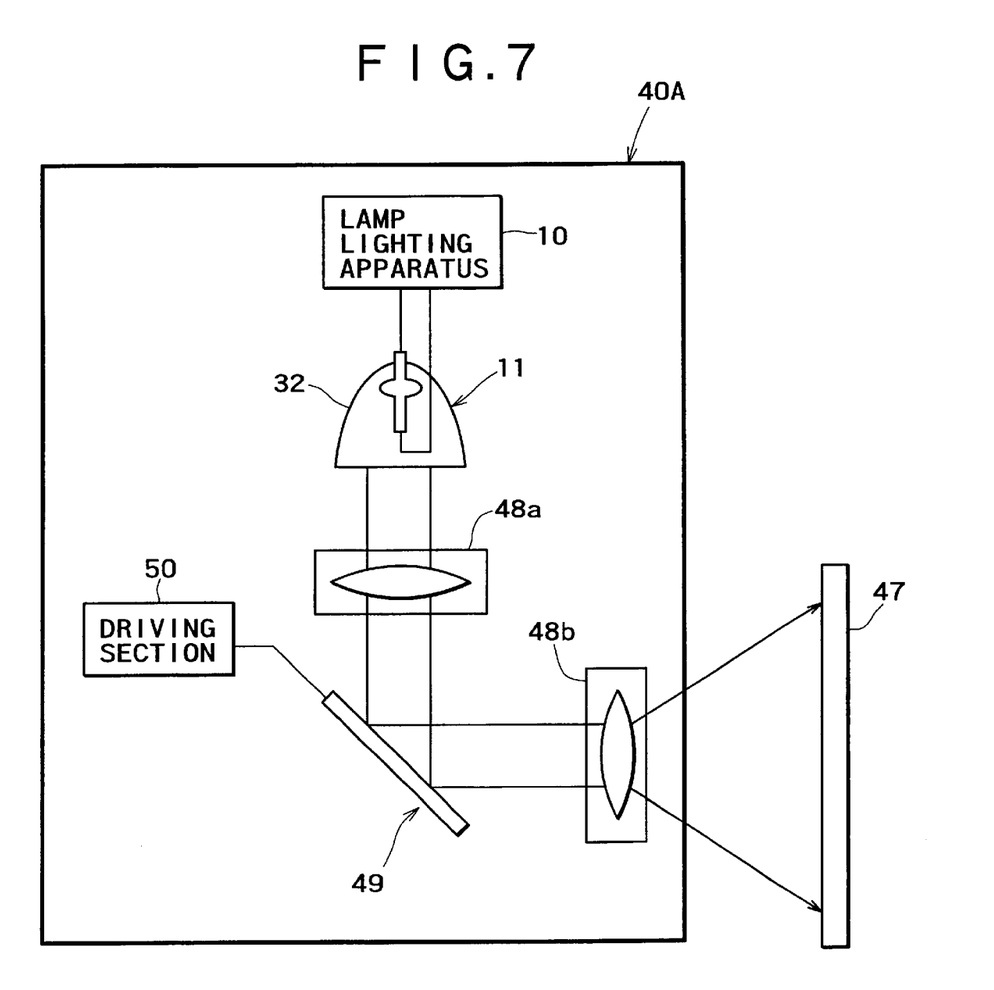
FIG. 7 is a schematic view showing a configuration of a projector according to a fourth embodiment of the present invention.

Now, a projector according to a fourth embodiment of the present invention is described with reference to FIG. 7.

A projector 40A according to the fourth embodiment of the present invention is formed as a projector of the reflection type and uses the lamp lighting apparatus 10 according to the first and second embodiments with reference to FIG. 1 or 4.

The projector 40A of the reflection type includes, in addition to the lamp lighting apparatus 10 in which the voltage control section 19 is incorporated, a lamp 11 having a reflector 32 for reflecting light emitted from a light source thereof under the control of the lamp lighting apparatus 10, a first lens section 48a for condensing rays of light from the lamp 11, a reflection type image panel 49 for reflecting the rays of light condensed by the first lens section 48a, a second lens section 48b for projecting the rays of image light reflected by the reflection type image panel 49 onto a screen 47, and a driving section 50 for receiving RGB signals, a video signal or the like to drive the reflection type image panel 49.

The reflection type image panel 49 is formed from a liquid crystal panel of the reflection type or a panel of the DLP (Digital Light Processing) type.

A panel of the DLP type is a panel which uses a DMD (Digital Micromirror Device). The DMD is formed from a semiconductor optical switch composed of very small movable mirrors. More particularly, the semiconductor optical switch is structured such that a very small mirror of 16 μm square of an aluminum alloy formed on each one of cells of an SRAM (Static Random Access Memory) has an inclination of plus or minus 10 degrees in an on or off state and is supported on a support post and operated by an action of an electrostatic field produced by a memory element disposed immediately therebelow. A number of such mirrors not less than 848×600 are integrated on one chip, and the chip has a degree of integration of not less than 2,300,000 mirrors in the maximum. The switching speed of each mirror is not less than 500,000 times per second, and incoming light to the chip is reflected as light having a digital gray scale. In other words, light can be controlled fully digitally, and there is no necessity for a process of converting a digital signal into a luminance signal by means of a D/A converter as in the related art.

In the projector 40A having such a configuration as described above, when the lamp 11 is to be lit, the lamp lighting apparatus 10 in which the voltage control section 19 is incorporated applies a gradually rising induced voltage $V_L$ to the lamp 11 to light the lamp 11 in accordance with the characteristic of the lamp 11. Therefore, the projector 40A has such a characteristic of the voltage control section 19 that a lamp is lit without application of an unnecessarily high voltage thereto.

While preferred embodiments of the present invention have been described using specific terms, such description is for illustrative purposes only, and it is to be understood that changes and variations may be made without departing from the spirit or scope of the following claims.

What is claimed is:

1. A lamp lighting apparatus comprising:
   voltage controlling means for supplying a voltage having a peak value that rises stepwise; and
   power conversion means for converting an output of said voltage controlling means into a high voltage and applying the high voltage to a lamp to light the lamp and for supplying to the lamp, after the lamp is in a lit state, an AC current to maintain a discharge of the lamp.

2. The lamp lighting apparatus according to claim 1, further comprising: voltage detection means and current detection means for detecting an AC voltage supplied to lamp and detecting an AC current flowing in the lamp, respectively,
   wherein a power required to maintain the lamp in the lit state is controlled to a fixed power value based on a result of a detection by said voltage detection means and a result of a detection by said current detection means.

3. A lamp lighting apparatus comprising:
   power conversion means including a transformer having a primary winding and a secondary winding for outputting, when a predetermined voltage is applied to said primary winding, a high voltage obtained at said secondary winding to light a lamp and for supplying to the lamp, after the lamp is lit, an AC current to maintain the lamp in a discharging state from said secondary winding;
   voltage controlling means for outputting a pulse voltage having a driving time that increases stepwise; and
   switching means controlled in an on state with an output of said voltage controlling means for applying the predetermined voltage to said primary winding to excite said primary winding.

4. The lamp lighting apparatus according to claim 3, wherein said voltage controlling means includes a triangular wave outputting circuit for supplying a triangular wave voltage repetitively in predetermined cycles, a charging circuit for supplying a charging voltage, and a comparison circuit for comparing an output of said charging circuit and an output of said triangular wave outputting circuit with each other.

5. A lamp lighting apparatus comprising:
   power conversion means including a transformer having a primary winding and a secondary winding for outputting, when a charging voltage is applied to said primary winding, a high voltage obtained on said secondary winding to light a lamp and for supplying to the lamp, after the lamp is lit, an AC current to maintain the lamp in a discharging state from said secondary winding;
   voltage controlling means including a charging circuit for supplying the charging voltage, a voltage dividing circuit for dividing an output of said charging circuit, and a circuit for lowering a dividing ratio of said voltage dividing circuit in a stepwise fashion; and
   switching means controlled to be in an on state with an output of said voltage controlling means for applying the charging voltage to said primary winding to excite said primary winding.

6. The lamp lighting apparatus according to claim 5, further comprising: voltage detection means for detecting a voltage supplied to the lamp, and current detection means for detecting an AC current flowing in the lamp,
   wherein a power to maintain the lamp in a lit state is controlled to a fixed power value based on a result of a detection by said voltage detection means and a result of a detection by said current detection means.

7. A projector comprising:
   voltage controlling means for supplying a voltage having a peak value that rises stepwise;
   power conversion means for converting an output of said voltage controlling means into a high voltage and applying the high voltage to a lamp to light the lamp and for supplying to the lamp, after the lamp is in a lit state, an AC current to maintain a discharge of the lamp to maintain the lamp in the lit state;
   a display panel for one of transmitting light therethrough and reflecting light emitted from the lamp lit by said power conversion means; and
   an optical system for projecting light output from said display panel.

8. The projector according to claim 7, further comprising: voltage detection means and current detection means for detecting an AC voltage applied to the lamp and for detecting an AC current flowing in the lamp, respectively,
   wherein a power to maintain the lamp in the lit state is controlled to a fixed power value based on a result of a detection by said voltage detection means and a result of a detection by said current detection means.

9. A projector comprising:

power conversion means including a transformer having a primary winding and a secondary winding for outputting, when a predetermined voltage is applied to said primary winding, a high voltage obtained at said secondary winding to light a lamp and for supplying to the lamp, after the lamp is in a lit state, an AC current to maintain the lamp in a discharging state to the lamp from said secondary winding;

voltage controlling means for outputting a pulse voltage having a driving time that increases stepwise;

switching means controlled into an on state with an output of said voltage controlling means for applying the predetermined voltage to said primary winding to excite said primary winding;

a display panel for one of transmitting light therethrough and reflecting light emitted from the lamp lit by said power conversion means; and an optical system for projecting light output from said display panel.

10. The projector according to claim 9, wherein said voltage controlling means includes a triangular wave outputting circuit for supplying a triangular wave voltage repetitively in predetermined cycles, a charging circuit for supplying a charging voltage, and a comparison circuit for comparing an output of said charging circuit and an output of said triangular wave outputting circuit with each other.

11. A projector comprising:

power conversion means including a transformer having a primary winding and a secondary winding for outputting, when a charging voltage is applied to said primary winding, a high voltage obtained at said secondary winding to light a lamp and for supplying to the lamp, after the lamp is in a lit state, an AC current to maintain the lamp in a discharging state from said secondary winding;

voltage controlling means including a charging circuit for supplying the charging voltage, a voltage dividing circuit for dividing an output of said charging circuit and a circuit for lowering a dividing ratio of said voltage dividing circuit in a stepwise fashion;

switching means controlled to be an on state with an output of said voltage controlling means for applying the charging voltage to said primary winding to excite said primary winding;

a display panel for one of transmitting light therethrough and reflecting light emitted from the lamp lit by said power conversion means; and an optical system for projecting light output by said display panel.

12. The projector according to claim 11, further comprising: voltage detection means for detecting a voltage supplied to the lamp, and current detection means for detecting an AC current flowing in the lamp, wherein a power to maintain the lamp in the lit state is controlled to a fixed power value based on a result of a detection by said voltage detection means and a result of a detection by said current detection means.

* * * * *